A. NORRIS.
CONVERTIBLE SELF GRINDING HOE.
APPLICATION FILED AUG. 6, 1918.
1,312,802. Patented Aug. 12, 1919.
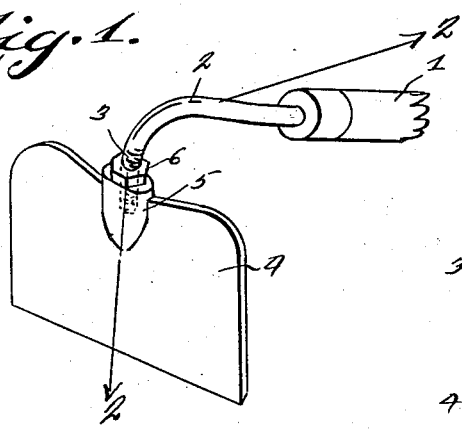
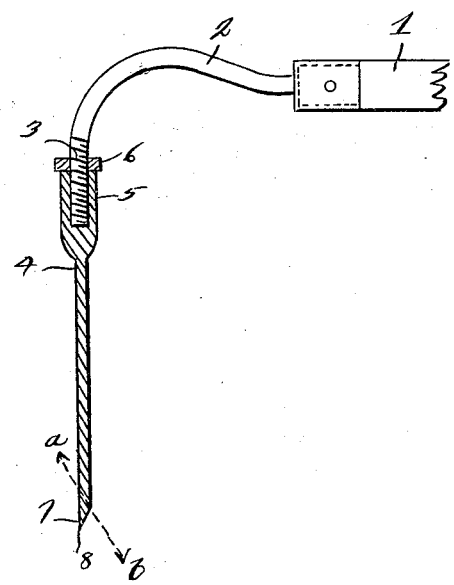
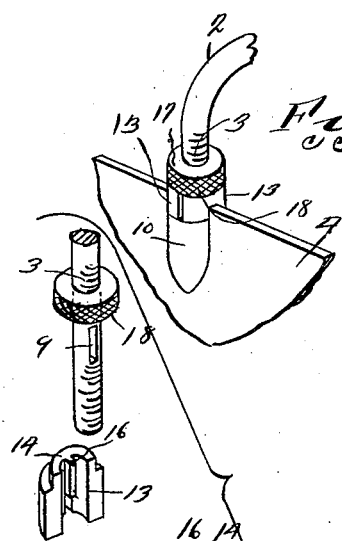
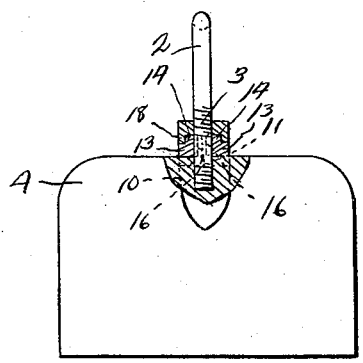
Inventor
A. Norris

UNITED STATES PATENT OFFICE.

ALEXANDER NORRIS, OF DEXTER CITY, OHIO.

CONVERTIBLE SELF-GRINDING HOE.

1,312,802.  Specification of Letters Patent.  Patented Aug. 12, 1919.

Application filed August 6, 1918. Serial No. 248,565.

*To all whom it may concern:*

Be it known that I, ALEXANDER NORRIS, a citizen of the United States, residing at Dexter City, in the county of Noble, State of Ohio, have invented a new and useful Convertible Self-Grinding Hoe; and I do hereby declare the following to be a full, clear, and exact description of the invention, such as will enable others skilled in the art to which it appertains to make and use the same.

This invention relates to an improved convertible self grinding hoe, and an object of the invention is to provide a device of this kind in which the hoe blade after it becomes worn on its outer face adjacent the cutting edge, may be reversed, hence providing a new cutting edge, and allowing the outer face near said edge to again become worn or ground. This use of the hoe blade may continue, until the blade has been substantially entirely consumed or worn away.

A further object of the invention is to provide improved means for connecting the hoe blade to the shank of the handle, so that the blade may be reversed.

A further object of the invention is to provide improved locking means, to prevent turning of the blade when once having been adjusted.

In practical fields the details of construction may necessitate alterations falling within the scope of what is claimed.

The invention comprises further features and combination of parts as hereinafter set forth shown in the drawings and claimed.

In the drawings:—

Figure 1 is a view in perspective of a self grinding hoe constructed in accordance with the invention.

Fig. 2 is a perspective view on line 2—2 of Fig. 1.

Fig. 3 is a view in elevation of a hoe blade and the shank of the handle showing a different connection between the shank and the blade.

Fig. 4 is a detail perspective view of the structure shown in Fig. 3.

Fig. 5 is a collective view showing a plurality of the parts of the structure of the connection in Figs. 3 and 4.

Referring more especially to the drawings 1 designates a conventional form of handle provided with a hoe shank 2, the downwardly extending end 3 of which is threaded. A hoe blade which is self grinding is provided. This blade 4 has a cylindrical enlargement 5, which is internally threaded to be engaged by the threaded end 3 of the shank 2, there being a nut 6 also threaded upon the threaded portion 3 of the shank, to contact with the upper end of the cylindrical enlargement, to prevent turning of the hoe blade after having once been adjusted. It has been found that in using a hoe of this kind the outer face 7 of the hoe blade adjacent the cutting edge 8 becomes worn sufficiently on an angle as indicated by the dotted line $a$—$b$ and after the blade has become so worn it may be reversed hence renewing the cutting edge for the hoe blade. To reverse the blade the nut 6 is loosened, and the blade turned, and the nut again tightened. In Figs. 3, 4 and 5 the threaded end 3 of the shank has a transverse slot 9. The hoe blade 4 in Figs. 3, 4 and 5 also has a cylindrical enlargement 10, but which is spaced slightly below the upper edge of the blade. The blade has a notch or cutaway portion 11 immediately adjoining the interiorly threaded bore 12 of the enlargement 10. Semi-circular members 13 are provided. These members have reduced portions 14, and their lower portions have notches 15, which arch the upper edge portion of the hoe blade, as shown clearly in the drawings. The inner surface of the members 13 (which are semi-circular in cross section) have ribs 16, engaging the slot 9, thereby preventing turning of the threaded end 3 in the enlargement 10. A collar 17 is threaded on the end 3 of the shank 2 and is flanged as shown at 18 so as to telescope over the reduced parts 14 of the members 13, thereby locking the members 13 in place. By this construction there is no possibility of the hoe blade becoming accidentally loosened but will be held rigidly in place.

The invention having been set forth what is claimed as new and useful is:—

In a self grinding garden hoe, the combination with a handle having a shank provided with a laterally turned threaded end, of a hoe blade provided with a self renewing cutting edge and capable of reversibility whereby the cutting edge may be utilized, said hoe blade having a threaded socket into which said end is threaded, said socket having its upper end spaced a short distance below the upper edge of the blade, said threaded end having a slot, a pair of diametrically opposed members arching the upper edge portion of the blade adjacent said socket and having tongues engaging said slot, said members having reduced parts, and a device threaded on said end and adapted to fit over said reduced parts to lock the members in place.

In testimony whereof I have signed my name to this specification in the presence of two subscribing witnesses.

ALEXANDER NORRIS.

Witnesses:
G. W. EICHHORN,
CECIL NORRIS.

Copies of this patent may be obtained for five cents each, by addressing the "Commissioner of Patents, Washington, D. C."